United States Patent [19]

Imai et al.

[11] 4,074,001

[45] Feb. 14, 1978

[54] FIXING ROLL FOR ELECTROPHOTOGRAPHY

[75] Inventors: Kiyoshi Imai; Nobuyuki Hasebe, both of Annaka; Tomiaki Asami, Numazu; Setsuo Soga, Mitaka; Ichiro Fukushima; Yasuo Asahina, both of Tokyo, all of Japan

[73] Assignees: Shin-Etsu Chemical Co., Ltd.; Ricoh Company, Ltd., both of Tokyo, Japan

[21] Appl. No.: 698,897

[22] Filed: June 23, 1976

[30] Foreign Application Priority Data

June 24, 1975 Japan .................................. 50-76848

[51] Int. Cl.[2] ....................... B32B 15/08; G03G 13/20

[52] U.S. Cl. ....................................... 428/329; 29/132; 118/60; 432/60; 427/22; 427/387; 427/407 R; 427/409; 428/328; 428/332; 428/339; 428/330; 428/447; 428/450; 428/469

[58] Field of Search .................. 29/132; 428/447, 450, 428/36, 469, 328, 329, 330, 339; 427/407 R, 409, 22, 387; 118/60; 432/60

[56] References Cited

U.S. PATENT DOCUMENTS

| | | | |
|---|---|---|---|
| 2,941,905 | 6/1960 | Hofmann | 428/329 |
| 3,511,729 | 5/1970 | Williams | 29/132 |
| 3,627,851 | 12/1971 | Brady | 428/447 |
| 3,809,854 | 5/1974 | Sanders | 428/329 |
| 3,936,578 | 2/1976 | Dumoulin | 428/447 |
| 3,983,265 | 9/1976 | Letoffe | 428/447 |
| 3,987,530 | 10/1976 | Atkin | 428/447 |

OTHER PUBLICATIONS

"Encyclopedia of Poly. Sci. & Tech.", vol. 12, pp. 514–515 and p. 527.

*Primary Examiner*—Ellis Robinson

*Attorney, Agent, or Firm*—Toren, McGeady and Stanger

[57] ABSTRACT

A fixing roll for electrophotography having a surface layer of a cured room-temperature-vulcanizing silicone rubber composition comprising a mixture consisting of two diorganopolysiloxanes, one of which is terminated at the chain ends with silanol groups and has a relatively high viscosity, and the other of which is terminated at the chain ends with trialkyl silyl groups and has a relatively low viscosity, an alkoxysilane or a partial hydrolysis-condensate thereof as the crosslinking agent, a metal salt of an organic acid as the reaction catalyst, and three kinds of inorganic fillers, namely, calcium carbonate, iron oxide, and titanium dioxide, and containing substantially no siliceous fillers. The fixing rolls have excellent properties including, in particular, the ability to provide a long copy-life to electrophotographic copying machines.

7 Claims, No Drawings

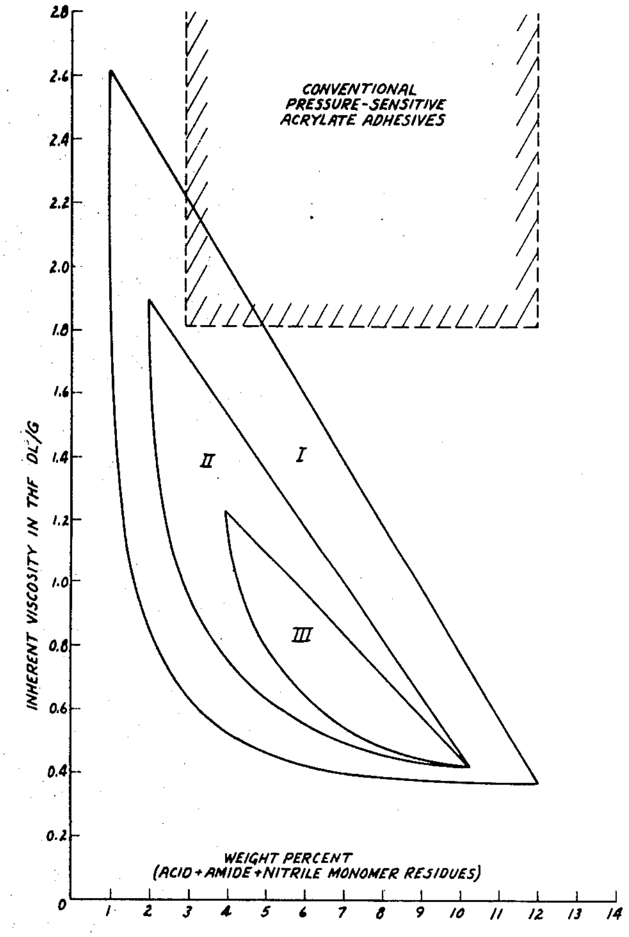

FIXING ROLL FOR ELECTROPHOTOGRAPHY

BACKGROUND OF THE INVENTION

1. Field of the Invention

This invention relates to improvements to an electrohotographic copying machine. Particularly, the invention relates to an improved hot-roll for fixing the toner images. Specifically, the invention relates to improvements to the surface material of the fixing roll which is useful in electrophotograpy.

2. Description of the Prior Art

There have been proposed several methods for flying reproduced images to paper in electrophotography. The most widely practiced method among them is the so-called "hot-roll method" using a heated roll to settle the images formed by a toner containing a fusible resin as the binder on a copying paper by heat-fusing. The hot-roll method has some advantages, for example, higher efficiency of fixing, use of relatively low temperatures with decreased possibility of problems arising avoidance of the need to use special chemicals, and compact construction of the copying machines. Hitherto, a metal roll whose surface is coated with a fluoropolymer or a room-temperature-vulcanizing silicone rubber has been used as the fixing roll for the hot-roll method because of their excellent thermal stability and releasability. See U.S. Pat. Nos. 3,268,351 (Moser) and 3,498,596 (Van Dorn).

However, the fixing rolls coated with a fluoropolymer are disadvantageous because it is necessary to repeatedly apply a release agent over the surface of the fluoropolymer layer during copying runs to augment or make up the insufficient release property inherent in the fluoropolymer itself. Accordingly, the copying machine provided with the fluoropolymer-coated hot-roll should have an additional device for the application of the release agent, which results in rendering the construction of the machine more complicated.

On the other hand, the hot-rolls coated with a room-temperature-vulcanizing silicone rubber can exhibit an excellent release property in the early part of the copying runs. Such release property then rapidly decreases and, as a result, the range of temperature for the fixing step becomes steadily narrower, thus the fixing rolls coated with a room-temperature-vulcanizing silicone rubber have proven to have a shorter copy-life and have to be subjected to frequent renewal or replacement in order to avoid the so-called off-set phenomenon, i.e., transfer of the toner to the surface of the fixing roll, or winding of the copying paper around the roll.

Under the circumstances, improvements in the surface material of the fixing roll have been considered to be an important factor to increase the efficiency of electrophotographic copying.

SUMMARY OF THE INVENTION

An object of the present invention is to provide a fixing roll for electrophotography which is serviceable without external feeding of any release agent. Another object of the invention is to provide a fixing roll for electrophotography with a sufficient workability throughout a wide temperature range. Still another object of the invention is to provide a method for obtaining a fixing roll for electrophotography suitable for a long copying run without loosing the release property of the non-sticky surface. A further object of the invention is to provide a fixing roll useful in the hot-roll method with an unprecidented long copy-life.

In accordance with the present invention, a fixing roll is provided with at least its outermost surface layer composed of a cured silicone rubber composition comprising two kinds of diorganopolysiloxanes, one of which having diorganohydroxsilyl groups at the molecular terminals and a comparatively high viscosity which forms crosslinked structure by curing, and the other having trialkylsilyl groups at the molecular terminals and a comparatively low viscosity which is effective to give releasing property to the fixing roll, an alkoxy-containing silane or partial hydrolysis-condensation product thereof serving as the crosslinking agent, a metal salt of an organic acid serving as the crosslinking catalyst, and three kinds of fillers i.e., powdery calcium carbonate, iron oxide and titanium dioxide. In the silicone rubber composition, substantially no siliceous fillers are included, since the siliceous fillers are harmful in the maintenance of the releasing property of the cured silicone rubber composition. The fixing roll having an outermost surface layer formed from such a silicone rubber composition can exhibit an outstandingly long copy-life as compared to the prior art rolls, without replacement from time to time or application of any external releasing agent throughout a long period of copying operations.

DETAILED DESCRIPTION OF THE PREFERRED EMBODIMENTS

The present invention is based, in part, on the discovery that the room-temperature-vulcanizing silicone rubber compositions forming at least the outermost surface layer on the fixing roll a useful in fusing and fixing toner images to copy paper, overcome the problems involved in the prior art fixing rolls, and contribute to a remarkably and unprecedented long copy-life, when certain non-siliceous fillers are added, i.e., calcium carbonate, iron oxide and titanium dioxide. Such compositions also possess excellent releasing properties or non-stickiness throughout a wise temperature range.

The compositions in accordance with the invention comprise

A. 100 parts by weight of a mixture consisting of a. from 80 to 40% by weight of a diorganopolysiloxane terminated at both chain ends with diorganohydroxysilyl groups directly bonded to the terminal silicon atoms, having a viscosity of from 100 to 500,000 centistokes at 25° C and b. from 20 to 60% by weight of a diorganopolysiloxane terminated at both chain ends with trialkylsilyl groups, having a viscosity of from 5 to 200 centistokes at 25° C, B. from 0.5 to 10 parts by weight of an alkoxysilane represented by the general formula $$R_a^1Si(OR^2)_{4-a}$$

where $R^1$ and $R^2$ are saturated or unsaturated monovalent hydrocarbon groups and a is 0 or 1, or a partial hydrolysis-condensate of the alkoxysilane, C. from 0.1 to 5 parts by weight of a metal salt of an organic acid, D. from 10 to 80 parts by weight of powdery calcium carbonate with an average particle diameter of not exceeding 10 μm, E. from 10 to 80 parts by weight of powdery iron oxide with an average particle diameter of not exceeding 10 $\mu$m, and F. from 10 to 80 parts by weight of powdery titanium dioxide with an average particle diameter of not exceeding 10 $\mu$m, containing substantially no siliceous fillers.

Diorganopolysiloxane (a) in component (A) above are terminated at both chain ends with diorganohydroxysilyl groups and has a viscosity of from 100 to 500,000 centistokes, preferably, from 1,000 to 500,000 centistokes, at 25° C. This diorganopolysiloxane works to cure the silicone rubber composition, forming crosslinkages by dealcoholation condensation of its silanol groups with the alkoxy groups of component (B). The organic groups bonded to the silicon atoms in diorganopolysiloxane (a) are exemplified by methyl, phenyl and vinyl groups and halogen substituted groups thereof. Preferably, all or almost all of the organic groups are methyl groups. Further, dimethylhydroxysilyl groups are preferred as the terminal groups of the molecular chain. The viscosity of diorganopolysiloxane (a) at 25° C should be in the range given above, since diorganopolysiloxanes having a viscosity outside the range do not give a sufficient workability and satisfatory physical properties after cure to the silicone rubber compositions.

Another diorganopolysiloxane (b) in component (A) is terminated at both chain ends with trailkylsilyl groups and has a viscosity in the range of from 5 to 200 centistokes at 25° C. This diorganopolysiloxane is an essential element for providing the silicone rubber compositions with a releasing property and nonstickiness. The organic groups bonded to the silicon atoms in diorganopolysiloxane (b) are exemplified by methyl, phenyl and vinyl groups. Preferably, all or almost all of the organic groups are methyl groups. Further, trimethylsilyl groups are preferred as the terminal groups of the molecular chain. Viscosities lower than 5 centistokes at 25° C bring about a higher vapor pressure and hence more evaporation loss to the diorganopolysiloxane during the fabrication of fixing rolls and also the copying runs. On the other hand, viscosities higher than 200 centistokes at 25° C result in giving a shorter copy-life to the fixing rolls concerned.

With respect to the amounts of diorganopolysiloxanes (a) and (b) to form component (A) in accordance with the present invention, i.e., 80 to 40% by weight and 20 to 60% by weight, respectively, it is a general tendency that diorganopolysiloxane (b) in an amount less than 20% by weight in component (A) will fail to give sufficiently strong and durable releasing properties to the fixing rolls while, on the other hand, diorganopolysiloxane (b) in an amount larger than 60% by weight will adversely effect the curability of the resulting composition and the physical properties of the composition after cure, and sometimes result in a bleed-through phenomenon.

Component (B) useful in the composition of the present invention is an alkoxysilane represented by the following general formula $$R_a^1Si(OR^2)_{4-a}$$

where $R^1$ and $R^2$ are saturated or unsaturated monovalent hydrocarbon groups and a is 0 or 1, or a partial hydrolysis-condensate of the alkoxysilane. This component (B) is essentially used to form crosslinkages by its reaction with the silanol groups contained in the above-mentioned diorganopolysiloxane (a) and to cure the silicone rubber composition. A lower alkyl group such as a methyl or ethyl group is preferred as group $R^1$ or $R^2$. Typical examples of the alkoxysilanes are tetraethoxysilane, methyl trimethoxysilane, methyl triethoxysilane and the like. The partial hydrolysis-condensates from these alkoxysilanes may be prepared by a known method using controlled amounts of water and an acid catalyst, provided that the degree of the partial hydrolysis condensation should naturally be such that the compatibility of the product with component (A) will not be impaired and at least 3 alkoxy groups remain in a molecule of the same product. For such a partial hydrolysis-condensate, the commercially available polyethyl silicate may be employed.

Component (B) should be used in an amount from 0.5 to 10 parts by weight per 100 parts by weight of component (A) in the composition. When the amount is less than 0.5 parts by weight, a sufficient cure of the composition cannot be attained, while the amounts larger than 10 parts by weight tend to form excessive crosslinkages, resulting in increasing the hardness of the surface layer prepared from the resulting composition making it unfit for the desired fixing rolls.

The metal salt of an organic acid as component (C) useful in the composition acts as a catalyst to accelerate dealcoholation condensation between the above-mentioned diorganopolysiloxane (a) and component (B), and may be selected from among any conventional catalysts suitable for the purpose. Most preferred are, for example, dibutyltin dilaurate, dibutyltin dioctoate and the like because of their compatibility with components (A) and (B) and the ease of adjusting the rate of the condensation reaction within a suitable range. The amount of component (C) in the silicone rubber composition may be determined in a wide range in accordance with the desired velocity of curing of the composition but, in general, it is from 0.1 to 5 parts by weight per 100 parts by weight of component (A).

Powdery calcium carbonate as component (D), powdery iron oxide as component (E) and powdery titanium dioxide as component (F) are all the inorganic fillers that are useful in the silicone rubber composition according to the present invention. Conventionally, siliceous fillers, such as, diatomaceous earth, fume silica, precipitated silica, fine powder of quartz and the like have been considered to be the most suitable inorganic fillers for the formulation of silicone rubber compositions and indispensable components to yield a cured silicone rubber having high mechanical strengths because of their marked efficiency for reinforcement. Nonetheless, it has been discovered by the extensive studies of the inventors that those siliceous fillers are extremely harmful when used in the silicone rubber composition for the fixing roll, while the three inorganic fillers, i.e., the above-mentioned components (D), (E) and (F), when used in specific amounts give satisfactory physical properties to the silicone rubber composition and a very long copy-life to the fixing roll.

As described in the above, the inclusion of siliceous fillers into the silicone rubber composition to be applied to the fixing roll, even though in small amounts, results in a remarked reduction of the copy-life of the fixing roll. The reason for this is not altogether clear, but may presumably be understood by the following mechanism.

The resinous component contained in the toner readily transfers to the surface of the silicone rubber layer owing to the high polarity of the silanol groups which are generally present in large numbers at the surfaces of the siliceous filler particles. The resinous component may, on the other hand, form chemical bonds with the surfaces of the siliceous filler particles in the silicone rubber composition, depending on the kind of the resin. Therefore, the toner tends to accumulate on the surface of the fixing roll, resulting in a quick reduction of the releasing property. The number of the silanol groups may be reduced by blocking them with trimethylsilyl groups in a treatment using, for example, trimethylchlorosilane. As such, complete removal of the silanol groups As such, complete removal of the silanol groups cannot be attained, and it only to slightly migitates the above-described harmful effects. Furthermore, it is presumed that, due to the fact that siliceous fillers have a high affinity with organopolysiloxanes, the siliceous fillers work to hinder the migration of diorganopolysiloxane (b) toward the surface of the cured silicone rubber composition layer, resulting in rendering it difficult for diorganopolysiloxane (b) to exhibit its releasing properties.

on the contrary, the desirable use of diorganopolysiloxane (b) in component (A) is suitably preserved by simultaneously using inorganic filler components (D), (E) and (F), and the resulting cured silicone rubber compositions have sufficiently good mechanical strengths for the intended purpose. The average particle size of these inorganic fillers must not exceed 10 μm, preferably a few micrometers or smaller, since coarser particles bring about adverse effects on the mechanical properties of the cured organopolysiloxane compositions. Further, the suitable amounts of the fillers in the desired composition are all from 10 to 80 parts by weight per 100 parts by weight of component (A). No fixing roll with satisfactory performance can not be obtained when those filler components are used in amounts outside the above range.

Besides components (A) to (F), the silicone rubber compositions for the fixing roll according to the present invention may contain various other conventional additives, such as, thermal-resistance improvers, antioxidants, coloring agents, and surface treatment agents for the inorganic fillers. Small amounts of other inorganic fillers except siliceous fillers may also be added.

The room-temperature-vulcanizing silicone rubber compositions useful for the fabrication of the fixing roll in accordance with the present invention are easily prepared by merely mixing components (A) to (F) by any adequate mixer at room temperature or at a slightly elevated temperature. The order of adding these components is not critical, provided however if a long shelf-life of the composition is desired, it is recommended to effect the addition of (C) just before the finished composition is applied to the fixing roll.

The thickness of the layer of the room-temperature-vulcanizing silicone rubber composition provided on the fixing roll surface is at least 1 mm, or preferably a few millimeters. The curing of the composition takes place at room temperature, but may be accelerated by heat for purposes of obtaining a higher efficiency of working.

The preparation of the desired fixing rolls using the silicone rubber compositions in accordance with the present invention is not particularly limited; any of the conventional methods can be satisfactorily applied.

The following examples illustrate the present invention. All "parts" in the examples are parts by weight.

"Copy-life" indicating the number of sheets of paper treated by one particular fixing roll in the examples is determined by the following manner.

With an electrophotographic copying machine, Type PPC-900, made by Ricoh Company, Ltd., Japan, a fixing roll prepared in accordance with each of the examples was mounted in place of the existing standard fixing roll, and a copy run was carried out under the test conditions given below until the copying paper started to wind round the fixing roll, then the number of sheets of the copy paper already fed was counted to denote the copy-life of the fixing roll.

| Test Conditions: | |
|---|---|
| Temperature for fixing | 165° C |
| Contact pressure for fixing | 7 kg |
| Original pattern to be copied | A sheet with about 20% of images areas. |
| Copying density | About 1.0, measured by Macbeth Densitometer, product of Macbeth Company |
| Copying paper | Sheets of paper specified for a PPC-900-type copying machine, product of Ricoh Company, sized B4 according to Japanese Industrial Standard, i.e., 257 × 364 mm |
| Copying speed | 15 sheets per minute |
| Toner | A toner specified for the PPC-900-type copying machine |

EXAMPLE 1

Room-temperature-vulcanizing silicone rubber compositions were prepared by mixing and kneading 70 parts of dimethylpolysiloxane terminated at both chain ends with dimethylhydroxysilyl groups, having a viscosity of 5,000 centistokes at 25° C, 30 parts of dimethylpolysiloxane terminated at both chain ends with trimethylsilyl groups, having a viscosity of 20 centistokes at 25° C, 3 parts of polyethyl silicate, 0.5 part of dibutyltin dilaurate, and the varying amounts of powdery calcium carbonate with an average particle diameter of 1.2 μm, powdery iron oxide with an averge particle diameter of 0.8 μm and powdery titanium dioxide with an average particle diameter of 0.3 μm, as indicated in Table I. With each of the compositions thus prepared (Samples Nos. 1–5) the surface of a roll made of stainless steel was coated in a thickness of about 3 mm, and then the cured coating was finished by grinding. The thus obtained rolls were used as the fixing rolls for the purpose of this example, and each fixing roll was tested for its copy-life with the results as set out in Table I.

Table I

| | Sample No. | | | | |
|---|---|---|---|---|---|
| | 1 | 2 | 3 | 4 | 5 |
| Calcium carbonate, parts | 35 | 20 | 30 | 40 | 20 |
| Iron oxide, parts | 30 | 20 | 30 | 15 | 60 |
| Titanium dioxide, parts | 25 | 20 | 30 | 10 | 40 |
| Copy-life, sheets | 30,000 | 27,500 | 30,500 | 25,000 | 34,000 |

EXAMPLE 2

Room-temperature-vulcanizing silicone rubber compositions (Samples Nos. 6 and 7) were prepared in the same manner as in the formation of Sample No. 1 in Example 1 except the first and second dimethylpolysiloxanes were used in amounts of 80 and 20 parts (for Sample 6) or 50 and 50 parts (for Sample 7),, instead of 70 and 30 parts. The fixing roll obtained in the same manner as in Example 1 with each of these compositions exhibited the following copy-life.

| | |
|---|---|
| With Sample No. 6 | 24,000 sheets |
| With Sample No. 7 | 35,000 sheets |

EXAMPLE 3

Fixing rolls were prepared according to the same manner as in Example 1 using the same room-temperature-vulcanizing silicone rubber composition as of Sample No. 1 in Example 1 except the second dimethylpolysiloxane (terminated at both chain ends with trimethylsilyl groups) had a viscosity at 25° C of 10 centistokes (for Sample No. 8), 50 centistokes (for Sample No. 9) or 100 centistokes (for Sample No. 10), instead of 20 centistokes. These fixing rolls exhibited the following copy-life.

| | |
|---|---|
| With Sample No. 8 | 26,000 sheets |
| With Sample No. 9 | 27,500 sheets |
| With Sample No. 10 | 25,000 sheets |

Another fixing roll was prepared with the same room-temperature-vulcanizing silicone rubber composition except methylphyenylpolysiloxane terminated with trimethylsilyl groups, having a viscosity of 100 centistokes at 25° C and consisting of 95 mole % of dimethylsiloxane units and 5 mole % of diphenylsiloxane units were included in place of the dimethylpolysiloxane employed in Sample Nos. 8–10. This fixing roll exhibited a copy-life of 24,000 sheets.

EXAMPLE 4

This is a comparative example. Fixing rolls were prepared according to the same manner as in Example 1 using the same room-temperature-vulcanizing compositions as Sample No. 1 in Example 1 except that any one or two of the inorganic fillers, i.e., calcium carbonate, iron oxide and titanium dioxide, were omitted (Sample Nos. 12–15) as set out in Table II together with their respective amounts used. Each fixing roll exhibited a copy-life as shown in Table II.

Table II

| | Sample No. | | | |
|---|---|---|---|---|
| | 12 | 13 | 14 | 15* |
| Calcium carbonate, parts | 40 | 60 | 45 | Nil |
| Iron oxide, parts | Nil | Nil | 45 | 60 |
| Titanium dioxide, parts | 30 | Nil | Nil | Nil |
| Copy-life, sheets | 15,000 | 20,000 | 19,500 | 15,000 |

*Without finishing by grinding of its cured surface.

EXAMPLE 5

This is another comparative example. Fixing rolls were prepared according to the same manner as in Example 1 using room-temperature-vulcanizing silicone rubber compositions (Sample Nos. 16–25) consisting of the same diorganopolysiloxane, polyethyl silicate and dibutyltin dilaurate in the same amounts as in Sample No. 1 of Example 1 and the varying inorganic filler or fillers as indicated in Table III together with their respective amounts used. Each fixing roll exhibited a copy-life as shown in the same table.

Table III

| | Sample No. | | | | | | | | | |
|---|---|---|---|---|---|---|---|---|---|---|
| | 16 | 17 | 18 | 19 | 20 | 21 | 22 | 23 | 24 | 25 |
| Diatomaceous earth, parts | 60 | 0 | 0 | 35 | 40 | 20 | 15 | 20 | 0 | 0 |
| Fume silica*, parts | 0 | 25 | 0 | 0 | 0 | 0 | 0 | 5 | 0 | 0 |
| Powdery quartz**, parts | 0 | 0 | 90 | 0 | 0 | 0 | 0 | 0 | 45 | 30 |
| Zinc oxide, parts | 0 | 0 | 0 | 0 | 0 | 0 | 0 | 0 | 0 | 10 |
| Calcium carbonate, parts | 0 | 0 | 0 | 25 | 0 | 25 | 20 | 20 | 20 | 15 |
| Iron oxide, parts | 0 | 0 | 0 | 0 | 60 | 0 | 25 | 0 | 0 | 15 |
| Titanium dioxide, parts | 0 | 0 | 0 | 0 | 0 | 25 | 15 | 20 | 15 | 15 |
| Copy-life, sheets | 2,600 | 2,400 | 6,500 | 3,500 | 3,000 | 9,000 | 10,000 | 7,000 | 8,000 | 9,800 |

*Surface-treated with trimethylchlorosilane. Specific surface area 230 $m^2/g$.
**Average particle diameter 5 μm.

EXAMPLE 6

This is a further comparative example. Using the same room-temperature-vulcanizing silicone rubber composition as Sample 1 of Example 1 except that the first and second dimethylpolysiloxanes were included in the proportion of 90 and 10 parts, instead of 70 and 30 parts, a fixing roll was prepared. The fixing roll was tested for its copy-life, to cover only 8,000 sheets.

Further, on the other hand, a similar formulation of the room-temperature-vulcanizing silicone rubber composition was made using the first and second dimethylpolysiloxanes in the proportion of 30 and 70 parts, and the resulting formulation was too soft to be suited for the preparation of the desired fixing roll.

EXAMPLE 7

This is a still further comparative example. A fixing roll was prepared according to the same manner as in Example 1, using the same room-temperature-vulcanizing silicone rubber composition as Sample 1 of Example 1 except that the second dimethylpolysiloxne (terminated at both chain ends with trimethylsilyl groups) had a viscosity of 1,000 centistokes at 25° C, instead of 20 centistokes at 25° C: The fixing roll exhibited a copy-life covering 12,000 sheets.

Apart from the above, a similar room-temperature-vulcanizing silicone rubber composition was formulated with 100 parts of the first dimethylpolysiloxane terminated at both chain ends with dimethylhydroxysilyl groups, having a viscosity of 5,000 centistokes at 25° C, in the total absence of the second dimethylpolysiloxane. With this composition a fixing roll was prepared, and the fixing roll exhibited a copy-life to cover 3,000 sheets.

What is claimed is:

1. A fixing roll for electrophotography having a surface layer with a thickness of at least 1 mm composed of a cured room-temperature vulcanizing silicone rubber composition comprising A. 100 parts by weight of a mixture consisting of
   a. from 80 to 40% by weight of a diorganopolysiloxane terminated at both chain ends with diorganohydroxysilyl groups directly bonded to the terminal silicon atoms, having a viscosity of from 100 to 500,000 centistokes at 25° C and
   b. from 20 to 60% by weight of a diorganopolysiloxane terminated at both chain ends with trialkylsilyl groups, having a viscosity of from 5 to 200 centistokes at 25° C, B. from 0.5 to 10 parts by weight of an alkoxysilane represented by the general formula $$R_a^1Si(OR^2)_{4-a}$$

where $R^1$ and $R^2$ are saturated or unsaturated monovalent hydrocarbon groups and *a* is 0 or 1, or a partial hydrolysis-condensate of the alkoxysilane, C. from 0.1 to 5 parts by weight of a metal salt of an organic acid, D. from 10 to 80 parts by weight of powdery calcium carbonate with an average particle diameter of not exceeding 10 μm, E. from 10 to 80 parts by weight of powdery iron oxide with an average particlediameter of not exceeding 10 μm, and F. from 10 to 80 parts by weight of powdery titanium dioxide with an average particle diameter of not exceeding 10 μm.

2. The fixing roll for electrophotography as claimed in claim 1 wherein diorganopolysiloxane (a) has organic groups selected from methyl, phenyl and vinyl groups and halogen substituted groups thereof bonded directly to silicon atoms.

3. The fixing roll for electrophotography as claimed in claim 1 wherein the terminal groups of diorganopolysiloxne (a) are dimethylhydroxysilyl groups.

4. The fixing roll for electrophotography as claimed in claim 1 wherein diorganopolysiloxane (b) has organic groups selected from methyl, phenyl and vinyl groups bonded directly to silicon atoms.

5. The fixing roll for electrophotography as claimed in claim 1 wherein the terminal groups of diorganopolysiloxane (b) are trimethylsilyl groups.

6. The fixing roll for electrophotography as claimed in claim 1 wherein said $R^1$ or $R^2$ group is a lower alkyl group selected from methyl and ethyl groups.

7. The fixing roll for electrophotography as claimed in claim 1 wherein said metal salt of an organic acid (C) is selected from dibutyltin dilaurate and dibutyltin dioctoate.

* * * * *